United States Patent
Azuma

(10) Patent No.: US 7,680,196 B2
(45) Date of Patent: Mar. 16, 2010

(54) ARRAY ANTENNA TRANSCEIVER AND CALIBRATING METHOD OF TRANSMISSION ROUTE USED FOR THE SAME

(75) Inventor: Tomohiro Azuma, Tokyo (JP)

(73) Assignee: NEC Corporation, Tokyo (JP)

( * ) Notice: Subject to any disclaimer, the term of this patent is extended or adjusted under 35 U.S.C. 154(b) by 1815 days.

(21) Appl. No.: 10/694,722

(22) Filed: Oct. 29, 2003

(65) Prior Publication Data

US 2004/0085929 A1  May 6, 2004

(30) Foreign Application Priority Data

Oct. 30, 2002 (JP) ............... 2002-315422

(51) Int. Cl.
*H04L 27/28* (2006.01)
*H04K 1/101* (2006.01)

(52) U.S. Cl. ............... 375/260; 375/219; 375/267; 375/316; 375/347

(58) Field of Classification Search ............... 375/260, 375/267, 347, 219, 316
See application file for complete search history.

(56) References Cited

U.S. PATENT DOCUMENTS

| | | | | |
|---|---|---|---|---|
| 5,960,330 A | * | 9/1999 | Azuma | 455/70 |
| 7,028,425 B2 | * | 4/2006 | Lasher | 40/781 |
| 7,072,693 B2 | * | 7/2006 | Farlow et al. | 455/562.1 |
| 7,076,168 B1 | * | 7/2006 | Shattil | 398/76 |
| 7,139,322 B1 | * | 11/2006 | Nergis | 375/260 |

FOREIGN PATENT DOCUMENTS

| | | |
|---|---|---|
| JP | 10-336149 A | 12/1998 |
| KR | 2001-0007526 A | 1/2001 |
| KR | 2002-0019600 A | 3/2002 |

* cited by examiner

*Primary Examiner*—Ted M Wang
(74) *Attorney, Agent, or Firm*—Sughrue Mion, PLLC

(57) ABSTRACT

The present invention provides a calibrating method of an array antenna transceiver for performing multicarrier transmission capable of minimizing the increase of a transceiver size and a signal processing load and keeping a certain calibration accuracy. A method of calibrating a transmission route using an array antenna transceiver for performing broadband transmission by a multicarrier includes grouping all subcarriers into a plurality of subcarrier groups and calibrating a transmission route for each group.

21 Claims, 10 Drawing Sheets

ARRAY ANTENNA TRANSCEIVER AND CALIBRATING METHOD OF TRANSMISSION ROUTE USED FOR THE SAME

BACKGROUND OF THE INVENTION

1. Field of the Invention

The present invention relates to a communication apparatus for performing broadband transmission by using tens to hundreds of subcarriers or more, particularly to an array antenna transceiver for performing adaptive antenna control and more particularly relates to calibration of the phase/amplitude characteristic between antennas in an array antenna transceiver.

2. Description of the Prior Art

For a cellular mobile communication system, a method is studied which forms a transmission directivity pattern for improving a signal in speed and quality, increasing a subscriber capacity, and increasing a transmission gain in the incoming direction of a desired signal and decreasing the interference to other users by using an array antenna transceiver constituted by a plurality of antenna elements with a high correlation. In this case, the array antenna transceiver forms a transmission directivity pattern of a transmission signal toward the incoming direction obtained from a desired signal received by an array antenna.

In the case of an array antenna transceiver having a plurality of radio transmission sections, generally the amplitude and phase of a transmitting radio section connected to each antenna element independently fluctuate momently. Therefore, it is necessary to compensate the fluctuation of a phase and amplitude when forming a transmission directivity pattern. The above operation is referred to as calibration.

Conventionally, this type of the array antenna transceiver calibrating method purposes to compensate the phase (delay) and amplitude (gain) of each radio reception section which independently fluctuate momently by inputting a known calibration signal into each transmitting radio section connected to each antenna element and using a result of demodulating a calibration signal as described in a patent document 1 "An array antenna radio CDMA communication units" (disclosed date; Dec. 18, 1998).

FIG. 8 is a block diagram showing a conventional array antenna transceiver for calibration.

The conventional array antenna transceiver is constituted by an array antenna (801), a distributor 1 (803-1) to a distributor N (803-N), a transmitting radio section 1 (804-1) to a transmitting radio section N (804-N) to be connected to each antenna element, a transmission baseband processing section 1 (805-1) to a transmission baseband processing section N (805-N) for producing the calibration signal, an adder (807) for synthesizing distributor outputs, a receiving radio section (808), calibration signal demodulating section 1 (809-1) to a calibration signal demodulating section N (809-N), and a demodulation result processing section (810).

The array antenna (801) is constituted by N antenna elements (802-1 to 802-N). The N antenna elements (802-1 to 802-N) are closely arranged like an array, which makes it possible to form a desired transmission directivity pattern by controlling a phase/amplitude by each transmission base band processing section. In this case, the number of antenna elements N is set to 3 or more in order to differentiate the configuration of the array antenna (801) from a normal diversity configuration.

The transmission baseband processing section 1 (805-1) to transmission baseband processing section N (805-N) generate calibration signals and output them to the transmitting radio section 1 (804-1) to transmitting radio section N (804-N) to which the sections 805-1 to 805-N are connected. In this case, it is assumed that a communication signal and a calibration signal are multiplexed and code multiplexing is performed. Moreover, a communication signal to which phase/amplitude control is applied every user is corrected by using a calibration coefficient output from the demodulation result processing section (810).

The transmitting radio section 1 (804-1) to transmitting radio section N (804-N) receive outputs of the transmission baseband processing section 1 (805-1) to transmission baseband processing section N (805-N), apply digital/analog conversion, orthogonal modulation, frequency conversion, amplification, band limitation and so firth to the multiple signal of a communication signal and calibration signal for a user, and output the multiple signal to the distributor 1 (803-1) to distributor N (803-N).

The distributor 1 (803-1) to distributor N (803-N) receive multiple signals of user signals and calibration signals which are outputs of the transmitting radio section 1 (804-1) to transmitting radio section N (804-N) and fetch some of the multiple signals to output them to the adder (807).

The adder (807) receives outputs of the distributor 1 (803-1) to distributor N (803-N) and combines output signals in a radio band to output them to the receiving radio section (808).

The receiving radio section (808) applies band limitation, amplification, frequency conversion, orthogonal demodulation, and analog/digital conversion and so forth to the combined signal and outputs the signal to the calibration signal demodulating section 1 (809-1) to calibration signal demodulating section N (809-N).

The calibration signal demodulating section 1 (809-1) to calibration signal demodulating section N (809-N) extract calibration signals in input signals from the multiple signal which is output from the receiving radio section (808), detects a transmission route 1 demodulation symbol point (phase/amplitude information) to transmission route N demodulation symbol point (phase/amplitude information), and outputs the detected symbol points to the demodulation result processing section (810).

The demodulation result processing section (810) receives outputs of the calibration signal demodulating section 1 (809-1) to calibration signal demodulating section N (809-N), calculates the correction information on transmission routes, and outputs the information to the transmission baseband processing section 1 (805-1) to transmission baseband processing section N (805-N). In this case, when normalization is performed by the transmission baseband processing section 1 (805-1), it is not necessary to send an input from the demodulation result processing section (810) to the transmission baseband processing section 1 (805-1).

Then, operations of a conventional example are described below.

The transmission baseband processing section 1 (805-1) to transmission baseband processing section N (805-N) generate communication signals and calibration signals for users in a baseband and output the signals to the transmitting radio section 1 (804-1) to transmitting radio section N (804-N).

The transmitting radio section 1 (804-1) to transmitting radio section N (804-N) receive communication signals and calibration signals in a baseband for users, which are outputs of the transmission baseband processing section 1 (805-1) to transmission baseband processing section N (805-N), apply digital/analog conversion and frequency conversion from the baseband to a radio band to the signals, and output the signals to the distributor 1 (803-1) to distributor N (803-N).

The distributor 1 (803-1) to distributor N (803-N) receive communication signal with users, which are outputs of the transmitting radio section 1 (804-1) to transmitting radio section N (804-N) and calibration signals in the same band, distribute some power of the signals, and output the signals to the adder (807).

The adder (807) receives communication signals with users, which are outputs of the transmitting radio section 1 (804-1) to transmitting radio section N (804-N) and N multiplexed calibration signals, combines the signals in a radio band, and outputs them to the receiving radio section (808).

The receiving radio section (808) receives a multiple signal which is an output of the adder (807), applies band limitation, amplification, frequency conversion, orthogonal demodulation, and analog/digital conversion and so forth to the signal, and outputs the signal to the calibration signal demodulating section 1 (809-1) to calibration signal demodulating section N (809-N).

The calibration signal demodulating section 1 (809-1) to calibration signal demodulating section N (809-N) extract calibration signals in input signals from a multiple signal output from the receiving radio section (808), detect a demodulation symbol point 1 (phase/amplitude information) to a demodulation symbol point N (phase/amplitude information), and output the points to demodulation result processing section (810). It is possible to extract a calibration signal multiplexed on an input signal through a de-spreading operation.

The demodulation result processing section (810) receives outputs of the calibration signal demodulating section 1 (809-1) to calibration signal demodulating section N (809-N), calculates calibration coefficients serving as correction information on routes in accordance with the demodulation symbol point 1 (phase/amplitude information) added with the phase/amplitude fluctuation of a transmission route including the transmitting radio section (804-1) and the demodulation symbol point 2 (phase/amplitude information) to the demodulation symbol point N (phase/amplitude information) added with the phase/amplitude fluctuations of the transmission routes 2 to N including the transmitting radio section 2 (804-2) to transmitting radio section N (804-N) and output the calibration coefficients to the transmission a baseband processing section 1 (805-2) to transmission baseband processing section N (805-N).

Then, a phase/amplitude information extracting method is described below in detail. It is defined that a transmission route including the transmitting radio section 1 (804-1) always serves as a reference route to assume a symbol point obtained by demodulating a calibration signal output from the transmitting radio section 1 (804-1) by the calibration signal demodulating section 1 (809-1) as a reference symbol point S1 (FIG. 9). Moreover, when assuming a symbol point output from the transmitting radio section 2 (804-2) and demodulated by the calibration signal demodulating section 2 (809-2) as S2 (FIG. 9) and a symbol point output from the transmitting radio section N (804-N) and demodulated by the calibration signal demodulating section N (809-N) as Sn (FIG. 9), the demodulating result processing section (810) detects the phase difference $\theta 2$ between S1 and S2, amplitude ratio r2=B/A, and phase difference $\theta n$ between S1 and Sn, and amplitude ratio rn=C/A. FIG. 10 shows the normalized reference symbol point S1. In this case, though values of the phase differences $\theta 2$ and $\theta n$ and those of the amplitude ratios r2 and rn are not changed, r2=B/A=B'/1 and rn=C/A=C'/1 are effected. The demodulation result processing section (810) outputs values of $\theta 2$ and $\theta n$ and those of r2 and rn to the transmission baseband processing section (805-1) to transmission baseband processing section (805-N).

The transmission baseband processing section 1 (805-1) to transmission baseband processing section N (805-N) correct communication signals which are phase/amplitude-controlled every user by using calibration coefficients output from the demodulation result processing section (810).

An array antenna transceiver having the above calibration means makes it possible to correct a phase/amplitude fluctuation by supplying calibration coefficients to the transmission baseband processing section 1 (805-1) to transmission baseband processing section N (805-N) even if a phase/amplitude fluctuation occurs in each transmission route while the transceiver is operated.

Therefore, the conventional array antenna transceiver shown in FIG. 8 makes it possible to form an accurate transmission directivity pattern by correcting a phase/amplitude fluctuation in each route for a communication signal with a user who forms a transmission directivity pattern by performing the weighting control according to phase/amplitude and then transmitting the communication signal.

[Patent Document 1]
Official gazette of Japanese Patent Laid-Open No. 10-336149

However, the above conventional calibrating method has the following problems.

Firstly, in the case of broadband transmission, components in a transceiver have different frequency characteristics (amplitude/phase). Therefore, to absorb the fluctuation of a frequency characteristic including an environmental change such as a temperature change or humidity change or aging, it is necessary to calibrate all subcarriers in all transmission routes in order to form an accurate transmission directivity pattern. Therefore, when applying a conventional calibrating method to a transceiver for performing broadband transmission through each antenna element by using hundreds to thousands of subcarriers, a problem occurs that it is necessary to calculate calibration coefficients of all subcarriers in all transmission routes in order to form an accurate transmission directivity pattern.

Secondly, a transmission baseband processing section for generating a calibration signal requires a calibration signal generating circuit for all subcarriers in all transmission routes and a calibration signal demodulating section requires a calibration signal demodulating section for all subcarriers in all transmission routes. Therefore, when applying a conventional calibrating method to a transceiver for performing broadband transmission through each antenna element by using hundreds to thousands of subcarriers, a problem occurs that the transceiver is greatly increased in size.

Thirdly, the number of routes to be calibrated is greatly increased and even if performing the time-sharing calibration every a plurality of subcarriers, the signal processing becomes complex. Moreover, to form an accurate transmission directivity pattern, it is necessary to calculate calibration coefficients by demodulating calibration signals simultaneously supplied to the largest possible number of transmission routes. Therefore, when applying the conventional calibrating method to a transceiver for performing broadband transmission through each antenna element by using hundreds to thousands of subcarriers, a problem occurs that the load of signal processing in calibration greatly increases.

BRIEF SUMMARY OF THE INVENTION

The first object of the present invention is to provide a transmission route calibrating method capable of minimizing the increase of the size of an array antenna transceiver for performing broadband transmission by a multicarrier and constantly keeping accuracy.

The second object of the present invention is to provide a transmission route calibrating method capable of minimizing the increase of the signal processing load of an array antenna transceiver for performing broadband transmission by a multicarrier and constantly keeping accuracy.

Third object of the present invention is to provide a transmission route calibrating method capable of constantly keeping an accuracy even for the temperature fluctuation of a transceiver though the number of carries for calibration and the number of carriers for calculation of calibration coefficients are greatly decreased.

[First Means for Solving the Problems]

The present invention uses an array antenna transceiver under operation of a system for performing broadband transmission by a multicarrier, which comprises demodulation symbol area determining means (112 in FIG. 1) for classifying and grouping demodulation symbol points (phase/amplitude information) of calibration signals transmitted from all subcarriers in all transmission routes for each area, calibration subcarrier selecting means (113 in FIG. 1) for selecting one demodulation symbol serving as a typical value and its transmission route number and subcarrier number from a demodulation symbol groups grouped for each area, calibration control means (114 in FIG. 1) for communicating a transmission route and a subcarrier for transmission of a calibration signal, a transmission route and a subcarrier for demodulation, calibration signal demodulating means (109-1 to 109-L in FIG. 1) for demodulating a calibration signal in accordance with the information on communicated transmission routes and subcarriers, and transmission baseband processing means (105-1 to 105-N in FIG. 1) for generating a calibration signal and setting calibration coefficients for all subcarriers in accordance with the information on communicated transmission routes and subcarriers.

[Second Means for Solving the Problems]

The present invention uses an antenna array transceiver under operation of a system for performing broadband transmission by a multicarrier, which comprises demodulation symbol point group selecting means (215 in FIG. 2) for deciding the same group in accordance with the dispersion of demodulation symbol point (phase/amplitude information) groups of calibration signals transmitted from all subcarriers in all transmission routes, calibration subcarrier selecting means (213 in FIG. 2) for selecting one demodulation symbol point serving as a typical value from demodulation symbol point groups grouped for each area and its transmission route number and subcarrier number, calibration control means (214 in FIG. 2) for communicating a transmission route and a subcarrier for transmission of a calibration signal, a transmission route and a subcarrier for demodulation, calibration signal demodulating means (209-1 to 209-L in FIG. 2) for demodulating a calibration signal in accordance with the information on communicated transmission routes and subcarriers, and transmission baseband processing means (205-1 to 205-N in FIG. 2) for generating a calibration signal and setting calibration coefficients for all subcarriers in accordance with the information on communicated transmission routes and subcarriers.

[Third Means for Solving the Problems]

The present invention uses an array antenna transceiver under operation of a system for performing broadband transmission by a multicarrier, which comprises transmission base band processing means (FIG. 6) for previously grouping j subcarriers in a frequency direction because neighbor subcarriers have frequency characteristics hardly different each other and setting a result of calibrating one subcarrier among j subcarriers as a common calibration coefficient for J-grouped subcarrier groups.

DETAILED DESCRIPTION OF THE PREFERRED EMBODIMENTS

Then, embodiments of the present invention are described below in detail by referring to the accompanying drawings.

[1] Description of Configuration

Figure 1:
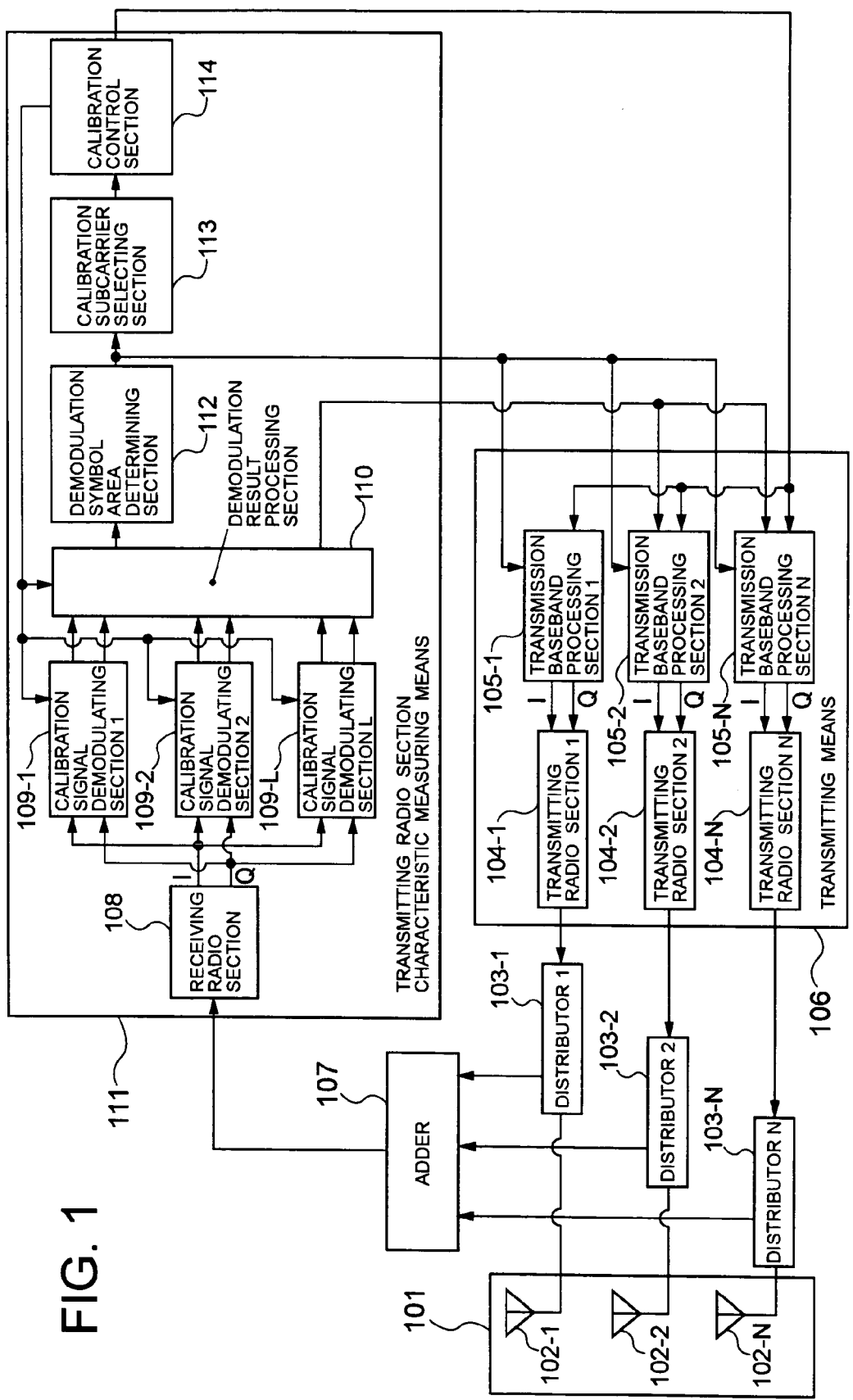
FIG. 1 is an illustration showing a first configuration of an array antenna transceiver using a calibrating method of the present invention.

FIG. 1 is a block diagram showing a configuration of a first embodiment of the present invention.

An array antenna (101) is constituted by N antenna elements (102-1 to 102-N) which are closely arranged so that the correlation between antennas becomes high.

A distributor (103-1) to a distributor (103-N) receive outputs of a transmitting radio section 1 (104-1) to a transmitting radio section N (104-N) and one-hand outputs are connected to antenna elements (102-1 to 102-N) and the other-hand outputs are connected to an adder (107).

The adder (107) receives communication signals with users and calibration signals from the distributor (103-1) to distributor (103-N), combine the signals in a radio band, and output the combined signal to a receiving radio section (108). In this case, it is possible to extract each calibration signal when it is demodulated. For example, code multiplexing is used.

The receiving radio section (108) receives a multiple signal from the adder (107), applies band limitation, amplification, frequency conversion, orthogonal demodulation, and analog/digital conversion and so forth to the multiple signal and outputs the signal to the calibration signal demodulating section (109-1) to calibration signal demodulating section (109-L).

The calibration signal demodulating section 1 (109-1) to calibration signal demodulating section (109-L) extract calibration signals in input signals from the multiplexing signal supplied from the receiving radio section (108) and from transmission routes and subcarriers supplied from the calibration control section (114), detect the demodulation symbol point 1 (phase/amplitude information) to demodulation symbol point L (phase/amplitude information), and output them to the demodulation result processing section (110).

In this case, to simultaneously calibrate all subcarriers in all transmission routes, calibration signal demodulating sections are necessary by the number of all transmission routes× all subcarriers. By using the above configuration, the transceiver size and signal processing load are increased. Therefore, in the calibration according to the present invention it is assumed that every L subcarriers are calibrated in time sharing for actual calibration and the number of calibration signal demodulating sections is set to L. Therefore, the number of calibration signals to be simultaneously generated also becomes L or less.

The demodulation result processing section (110) receives outputs of the calibration signal demodulating section 1 (109-1) to calibration signal demodulating section L (109-L) and a calibration mode change signal from the calibration control section (114) and outputs demodulation symbol points of all subcarriers in all transmission routes to the demodulation symbol area determining section (112) in the case of long-cycle calibration and calculated calibration coefficients to the transmission baseband processing section 2 (104-2) to transmission baseband processing section N (104-N) in the case of short-cycle calibration.

The demodulation symbol area determining section (112) receives an output of the demodulation result processing section (110), classifies and groups demodulation symbol points of all subcarriers in all transmission routes in accordance with preset areas, and outputs the information on demodulation symbol points, transmission routes, and subcarriers for each area to the calibration subcarrier selecting section (113).

The calibration subcarrier selecting section (113) receives an output of the demodulation symbol area determining section (112), selects a demodulation symbol point closest to the medium value in each area, and outputs the transmission route number and subcarrier number of the demodulation symbol point to the calibration control section (114).

The calibration control section (114) receives an output of the calibration subcarrier selecting section (113) and outputs a transmission route number and subcarrier number selected every area from the calibration subcarrier selecting section (113) to the transmission baseband processing section 1 (105-1) to transmission baseband processing section N (105-N) and the calibration signal demodulating section 1 (109-1) to calibration signal demodulating section L (109-L). Moreover, the calibration control section (114) outputs a control signal for changing two calibration modes such as a long-cycle calibration mode for deciding an area to which each demodulation symbol point belongs in accordance with the information on demodulation symbol points of all subcarriers in all transmission routes and a short-cycle mode for calibrating only a transmission route and subcarrier selected through long-cycle calibration to the transmission baseband processing section 1 (105-1) to transmission baseband processing section N (105-N), the calibration signal demodulating section 1 (109-1) to calibration signal demodulating section L (109-L), and the demodulation result processing section (110).

The transmission baseband processing section 2 (105-2) to transmission baseband processing section N (105-N) correct communication signals with users by using a calibration coefficient output from the demodulation result processing section (110) and then output the corrected communication signals to the transmitting radio section 2 (104-2) to transmitting radio section N (104-N) to be connected to the section 2 to section N. Moreover, the transmission baseband processing section 1 (105-1) to transmission baseband processing section N (105-N) generate calibration signals multiplexed on communication signals with users and output them to the transmitting radio section 1 (104-1) to transmitting radio section N (104-N) in accordance with the information on the calibration modes, communicated transmission routes and subcarriers notified by the calibration control section (114).

The transmitting radio section 1 (104-1) to transmitting radio section N (104-N) receives outputs of the transmission baseband processing section 1 (105-1) to transmission baseband processing section N (105-N), apply digital/analog conversion, orthogonal modulation, frequency conversion, amplification, and band limitation and so forth to multiplexed communication signal with users and calibration signals, and output the signals to the distributor 1 (103-1) to distributor N (103-N).

Figure 2:
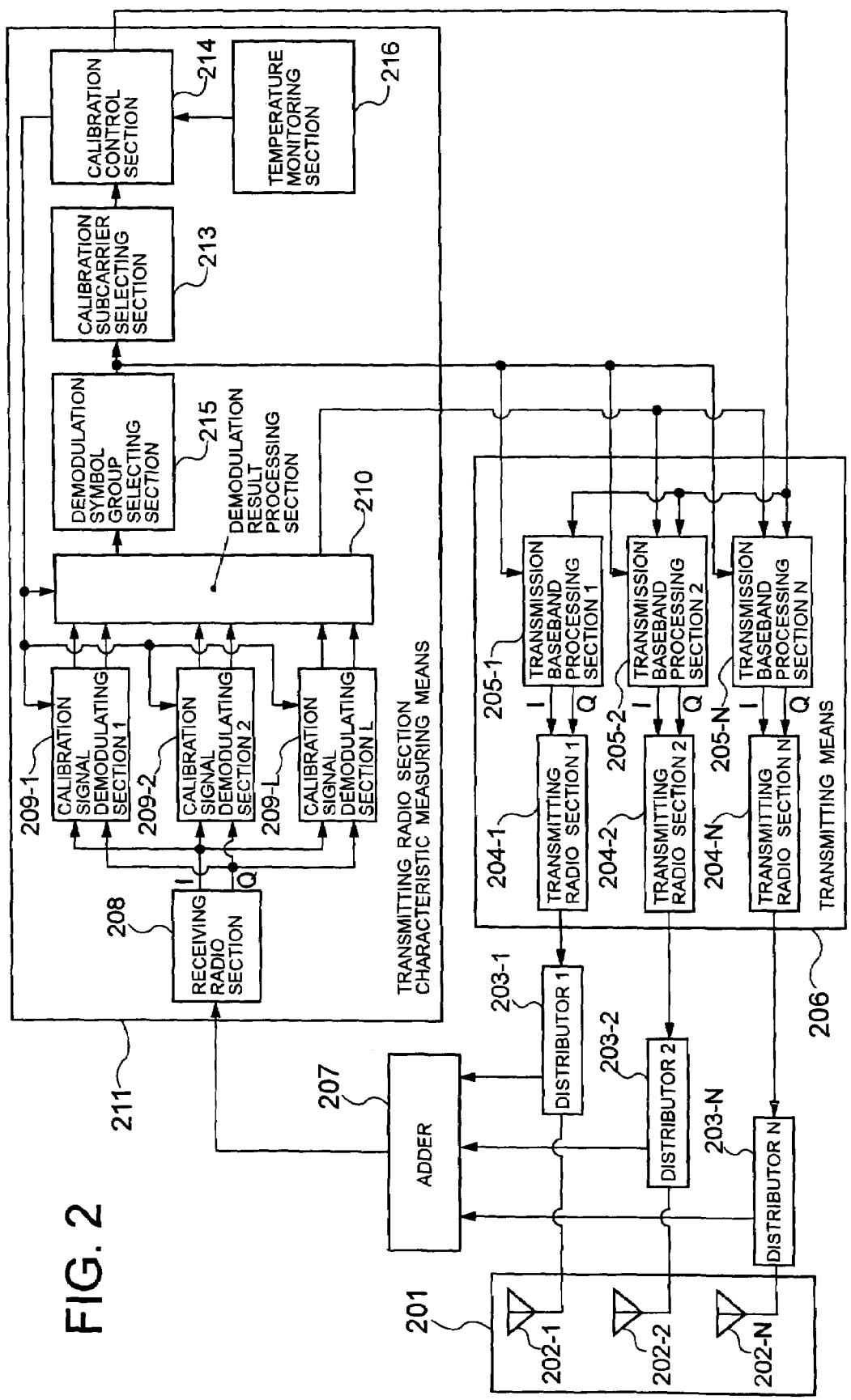
FIG. 2 is an illustration showing another embodiment of the first configuration of the present invention.

FIG. 2 is a block diagram showing a configuration of a second embodiment of the present invention. Portions different from those in FIG. 1 are described below.

A demodulation symbol group selecting section (215) receives an output of a demodulation result processing section (210), decides the same demodulation symbol point group in accordance with the dispersion of demodulation symbol points instead of previously dividing an area, and outputs the demodulation symbol point, transmission route number, and subcarrier number of the same group to the calibration subcarrier selecting section (213) and a transmission baseband processing section 2 (204-2) to transmission baseband processing section N (204-N).

A temperature monitoring section (216) detects the temperature in a transceiver and outputs temperature information to the calibration control section (214).

The calibration control section (214) receives an output of the temperature monitoring section (216) and outputs a calibration mode change signal for changing the present mode to the long-cycle calibration mode when the temperature to which long-cycle calibration is applied last time exceeds a preset temperature fluctuation threshold value to a transmission baseband processing section 1 (204-1) to the transmission baseband processing section N (204-N), the calibration signal demodulating section 1 (209-1) to calibration signal demodulating section L (209-L), and the demodulation result processing section (210).

[2] Description of Operations of Embodiments

Then, a first embodiment of the present invention is described below in detail by referring to FIG. 1.

The array antenna (101) is constituted by N antenna elements (102-1 to 102-N). N antenna elements (102-1 to 102-N) can respectively form a transmission directivity pattern for a communication signal with a user by controlling the phase/amplitude in each transmission baseband processing section.

However, it is not possible to form an ideal transmission directivity pattern due to frequency characteristics (phase/amplitude) of components in each transmission route including a transmitting radio section, characteristic fluctuation caused by temperature fluctuation or humidity fluctuation, or variation of aging.

In this case, a transmission route including the transmitting radio section 1 (104-1) is assumed as a transmission route 1 and transmission routes including the transmitting radio section 2 (104-2) to transmitting radio section N (104-N) as a transmission route 2 to transmission route N.

A calibrating method of the present invention has two calibration modes. One of them is a long-cycle calibration mode lowered in a frequency for deciding a transmission route and subcarrier for actually generating and demodulating a calibration signal by grouping demodulation symbol points having similar phase/amplitude characteristics and selecting a symbol point closest to the medium value in the group from the information on demodulation symbol points of all subcarriers in all transmission routes and the other of them is a short-cycle calibration mode raised in a frequency for setting calibration coefficients of all subcarriers in all transmission routes by calibrating only a transmission route and subcarrier selected through long-cycle calibration and applying a common calibration coefficient to subcarriers in the same group. The calibration control section (114) outputs a calibration mode change signal for changing these modes. As the cycle of each calibration mode, the long-cycle calibration is performed once per hour and the short-cycle calibration is performed once for 10 sec.

First, the long-cycle calibration mode is described below.

The calibration control section (114) outputs a calibration mode change signal to the transmission baseband processing section 1 (105-1) to transmission baseband processing section N (105-N), the calibration signal demodulating section 1 (109-1) to calibration signal demodulating section L (109-L), and the demodulation result processing section (110) for the purpose of performing a long-cycle calibration mode and grouping all subcarriers in all transmission routes.

The transmission baseband processing section 1 (105-1) to transmission baseband processing section N (105-N) generate calibration signals of all subcarriers in all transmission routes and output the signals to the transmitting radio section 1 (104-1) to transmitting radio section N (104-N). When assuming the number of transmission routes as N, the number of subcarriers as M, and the number of calibration signal demodulating sections as L, the number of calibration signals to be simultaneously generated is L or less and calibrations of (M×N)/L times are performed in the case of time sharing.

The transmitting radio section 1 (104-1) to transmitting radio section N (104-N) apply digital/analog conversion, orthogonal modulation, frequency conversion, amplification, and band limitation and so forth to calibration signals supplied from the transmission baseband processing means 1 (105-1) to transmission baseband processing section N (105-N) and output the signals to the distributor 1 (103-1) to distributor N (103-N).

The distributor 1 (103-1) to distributor N (103-N) receive outputs of the transmitting radio section 1 (104-1) to transmitting radio section N (104-N) and one-hand outputs are connected to the antenna elements antenna elements (102-1 to 102-N) and the other-hand outputs are connected to the adder (107). Most power of the multiple signal of communication signals with users and calibration signals supplied from the transmitting radio section 1 (104-1) to transmitting radio section N (104-N) is output to the connected antenna elements (102-1 to 102-N) and some of the power of the signal is output to the adder (107).

The adder (107) receives communication signals with users and calibration signals from the distributor 1 (103-1) to distributor N (103-N), combines the signals in a radio band, outputs them to the receiving radio section (108). In this case, it is possible to extract each calibration signal when it is demodulated. For example, code multiplexing is used.

The receiving radio section (108) receives a multiple signal from the adder (107), applies band limitation, amplification, frequency conversion, orthogonal demodulation, and analog/digital conversion and so forth to the signal, and outputs the signal to the calibration signal demodulating section 1 (109-1) to calibration signal demodulating section L (109-L).

The calibration signal demodulating section 1 (109-1) to calibration signal demodulating section L (109-L) extract calibration signals in input signals from the information on a multiple signal supplied from the receiving radio section (108) and a transmission route and subcarrier supplied from the calibration control section (114), detect the demodulation symbol point 1 (phase/amplitude information) to demodulation symbol point L (phase/amplitude information), and output them to the demodulation result processing section (110).

The demodulation result processing section (110) outputs demodulation symbol points of all subcarriers in all transmission routes to the demodulation symbol area determining section (112) in the long-cycle calibration mode. In this case, on the bases of the demodulation symbol point of the calibration signal of all subcarriers output from the transmission baseband processing means 1 (105-1) as a criterion, by normalizing demodulation symbol points of all subcarriers output from the transmission baseband processing means 2 (105-2) to transmission baseband processing section N (105-N), it is possible to obtain phase(delay)/amplitude(gain) information. Therefore, the demodulation result processing section (110) outputs demodulation symbol points (phase/amplitude), transmission route numbers, and subcarrier numbers normalized in all calibration signals generated by the transmission baseband processing means 2 (105-2) to transmission baseband processing section N (105-N) to the demodulation symbol area determining section (112).

In the demodulation symbol area determining section (112), the normalized demodulation symbol points, transmission route numbers and subcarrier numbers supplied from the demodulation result processing section (110) are classified and grouped every previously divided area. In the case of the demodulation symbol area determining section (112), dimensions of areas to be grouped are also changed by changing the number of areas to be divided. Thus, it is possible to adjust a calibration accuracy.

In this case, demodulation symbol points of all subcarriers in the transmission route 1 serve as a criterion (I/Q)=(1,0) for normalization. Therefore, it is not necessary to output a demodulation result to the demodulation symbol area determining section (112). To simplify description, the demodulation result on only the transmission route 2 is described below.

Figure 3:
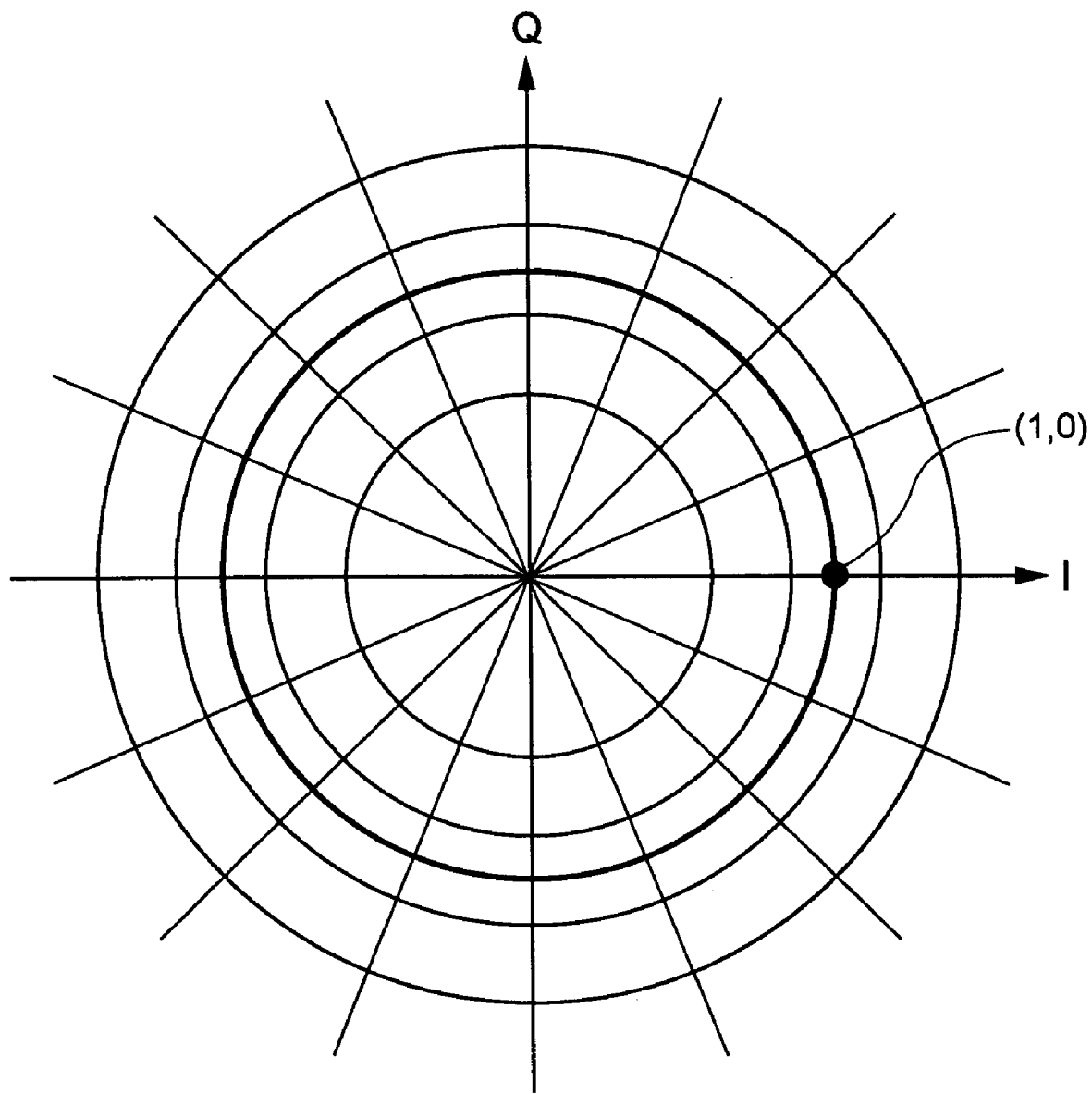
FIG. 3 is an illustration showing area division of an I/Q coordinate plane.

FIG. 3 shows an I/Q coordinate plane divided into 96 areas.

Figure 4:
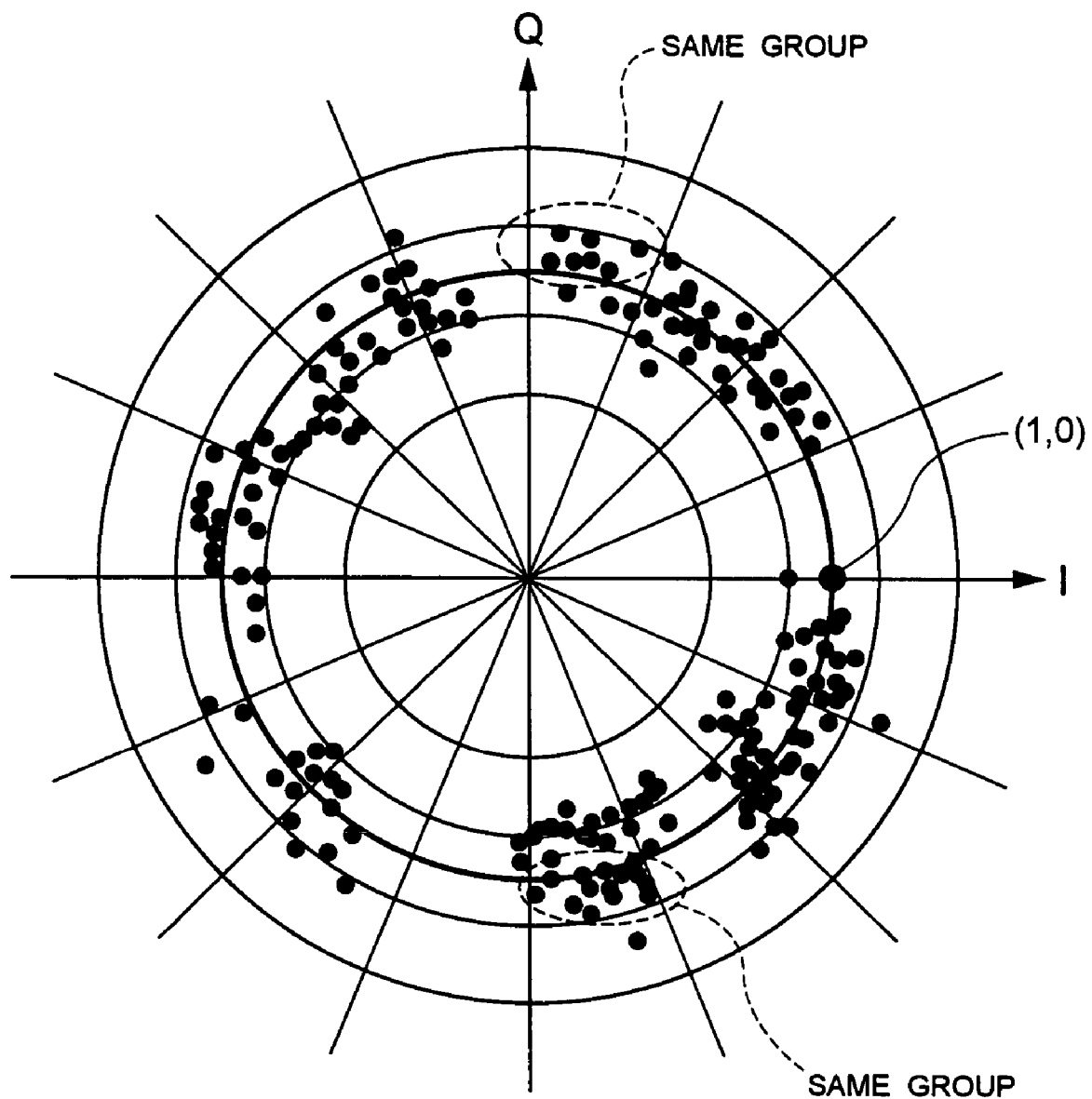
FIG. 4 is an illustration showing grouping of demodulation symbol points (after normalization)

In this case, by plotting normalized demodulation symbol points on all subcarriers in the transmission route 2, it is possible to group demodulation symbol points as shown in FIG. 4. A common calibration coefficient is applied to subcarriers having demodulation symbol points in areas in the same group in the transmission route 2.

Finally, demodulation symbol points in all subcarriers of the route 2 to route N are input to the demodulation symbol area determining section (112) and different route numbers or subcarrier numbers are handled as the same group as long as they are demodulation symbol points in the same area. Thus, a common calibration coefficient is applied to subcarriers having demodulation symbol points in areas in the same group.

The calibration subcarrier selecting section (113) receives the information on demodulation symbol points included in the same group and their route numbers and subcarrier numbers from the demodulation symbol area determining section (112) and outputs a demodulation symbol point having a phase/amplitude characteristic closest to the medium value in the group and its route number and subcarrier number to the calibration control section (114). Thus, one subcarrier to be calibrated is selected every area in which demodulation symbol points are included.

When the calibration control section (114) receives a route number and subcarrier number selected for each group which are outputs of the calibration subcarrier selecting section (113), it outputs a calibration mode change signal for changing the present mode to the short-cycle calibration mode to the transmission baseband processing means 1 (105-1) to transmission baseband processing section N (105-N), the calibration signal demodulating section 1 (109-1) to calibration signal demodulating section L (109-L), and the demodulation result processing section (110). Moreover, the section (114) actually outputs a transmission route number and subcarrier number for generating and demodulating a calibration signal to the transmission baseband processing means 1 (105-1) to transmission baseband processing section N (105-N) and the calibration signal demodulating section 1 (109-1) to calibration signal demodulating section L (109-L).

Then, the short-cycle calibration mode is described below.

A transmission route number and subcarrier number for transmitting a calibration signal are decided in accordance with an output result of the calibration control section (114) completing the long-cycle calibration mode. Therefore, calibration signals are output from the transmission baseband processing means 2 (105-2) to transmission baseband processing section N (105-N) to the transmitting radio section 2 (104-2) to transmitting radio section N (104-N). The transmission baseband processing section 1 (105-1) of the transmission route 1 serving as a criterion for all subcarriers outputs calibration signals for all selected subcarrier numbers to the transmitting radio section (104-1).

The transmitting radio section 1 (104-1) to transmitting radio section N (104-N) apply digital/analog conversion, orthogonal modulation, frequency conversion, amplification, and band limitation and so forth to calibration signals supplied from the connected transmission baseband processing means 1 (105-1) to transmission baseband processing section N (105-N) and output the signals to the distributor 1 (103-1) to distributor N (103-N).

The distributor 1 (103-1) to distributor N (103-N) receive outputs of the transmitting radio section 1 (104-1) to transmitting radio section N (104-N) and one-hand outputs are connected to the antenna elements (102-1 to 102-N) and the other-hand outputs are connected to the adder (107). Most power of the multiple signal of communication signals with users and calibration signals output from the transmitting radio section 1 (104-1) to transmitting radio section N (104-N) is output to the connected antenna elements (102-1 to 102-N) and some of the power is output to the adder (107).

The adder (107) receives communication signals with users and calibration signals from the distributor 1 (103-1) to distributor (103-N) as inputs, combines the signals in a radio band, and outputs them to the receiving radio section (108). In this case, it is possible to extract each calibration signal when it is demodulated. For example, code multiplexing is used.

The receiving radio section (108) receives a multiple signal from the adder (107) as an input, applies band limitation, amplification, frequency conversion, orthogonal demodulation, and analog/digital conversion and so forth to the signal, and output the signal to the calibration signal demodulating section 1 (109-1) to calibration signal demodulating section L (109-L). In this case, because there are only L demodulators, time-sharing calibration is performed when assuming the number of calibration signals to be generated through short-cycle calibration exceeds L.

The calibration signal demodulating section 1 (109-1) to calibration signal demodulating section L (109-L) receive a transmission route number and subcarrier number from the calibration control section (114) as inputs, extract calibration signals from a multiple signal output by the receiving radio section (108), and outputs their demodulation symbol points, transmission route numbers, and calibration numbers to the demodulation result processing section (110).

The demodulation result processing section (110) calculates calibration coefficients in accordance with demodulation results supplied from the calibration signal demodulating section 1 (109-1) to calibration signal demodulating section L (109-L) and outputs the calibration coefficients to the transmission baseband processing means 2 (105-2) to transmission baseband processing section N (105-N).

The transmission baseband processing means 2 (105-2) to transmission baseband processing section N (105-N) set calibration coefficients of all subcarriers in accordance with calibration coefficients supplied from the demodulation result processing section (110). One transmission route and subcarrier calibration coefficient selected in a group are set in common between grouped subcarriers.

Figure 5:
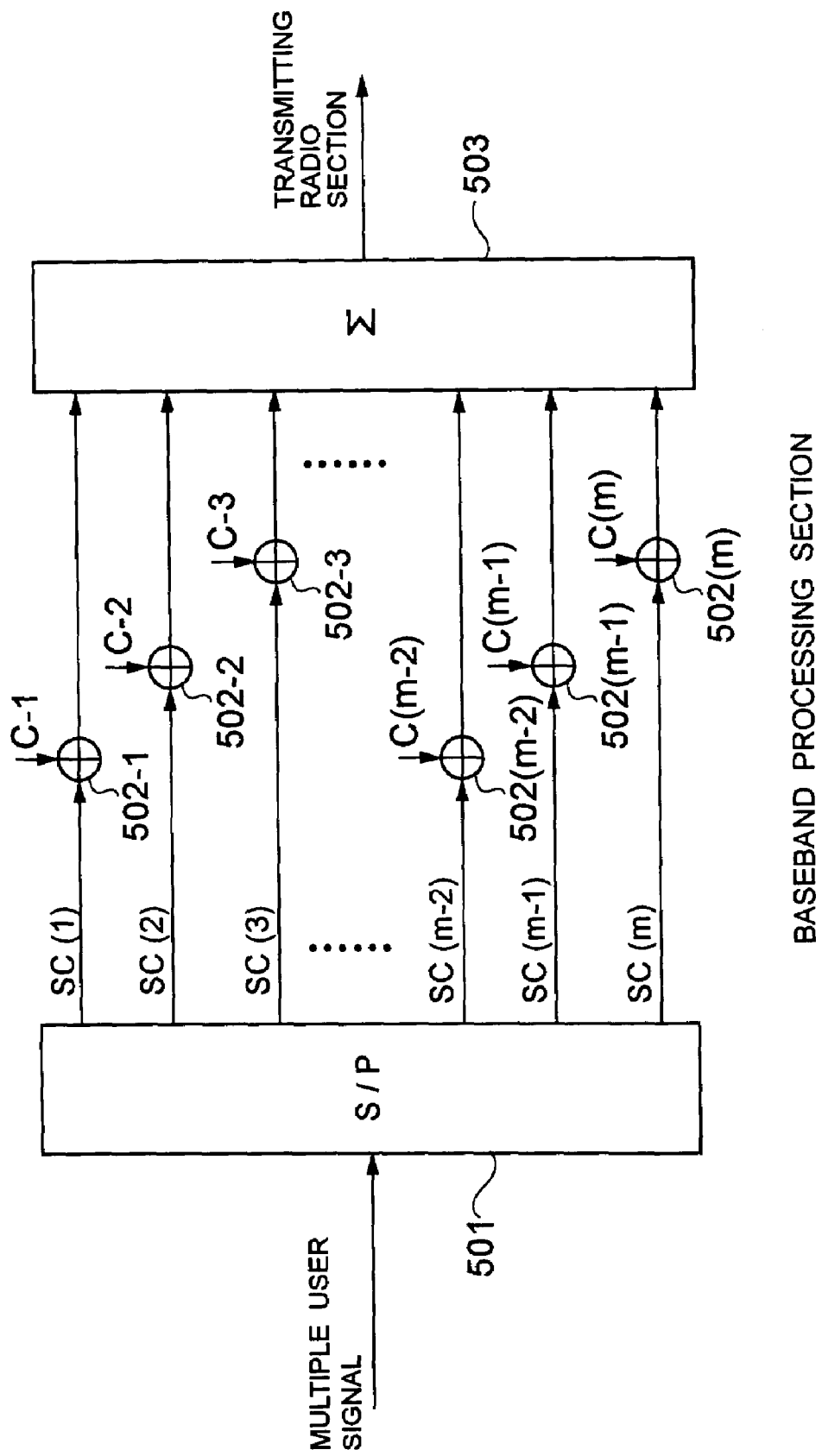
FIG. 5 is an illustration showing a calibration coefficient adding method 1.

Then, a method for adding calibration coefficients in the transmission baseband processing means 2 (105-2) to transmission baseband processing section N (105-N) is described below as shown in FIG. 5.

An S/P (501) denotes a serial/parallel converter. It receives serial data of a multiple user signal as an input and outputs the serial data for each subcarrier. An adder 1 (502-1) to adder m (502-m) receive outputs of the S/P (501) as inputs and add a calibration coefficient provided for each subcarrier. A Σ (503) denotes a combiner which receives outputs of the adder 1 (502-1) to adder m (502-m) as inputs and outputs combined multiple user signals to connected transmission radio section respectively.

The S/P (501) receives multiple signals of user signals which are already respectively weighted through phase/amplitude control every transmission route as inputs, converts each of the multiple signals into the serial data for each subcarrier, and outputs the serial data values to the adder 1 (502-1) to adder m (502-m). That is, when the number of subcarriers is M, SC (1), SC (2), . . . , and SC (m) are output.

The adder 1 (502-1) to adder m (502-m) apply correction of phases/amplitudes by calibration coefficients (C1, C2, . . . , and Cm) to multiple user signals SC (1), SC (2), . . . , and SC (m) every subcarrier which are outputs of the S/P (501) and then, output them to the Σ (503). In this case, because a common calibration coefficient can be applied to subcarriers belonging to the same group, C1=C2=Cm is effect d when assuming that SC (1), SC (2), and SC (m) belong to the same group.

The Σ (503) combines multiple user signals for each subcarrier corrected by calibration coefficients which are outputs of the adder 1 (502-1) to adder m (502-m) and outputs the combined signal to each connected transmitting radio section.

Figure 6:
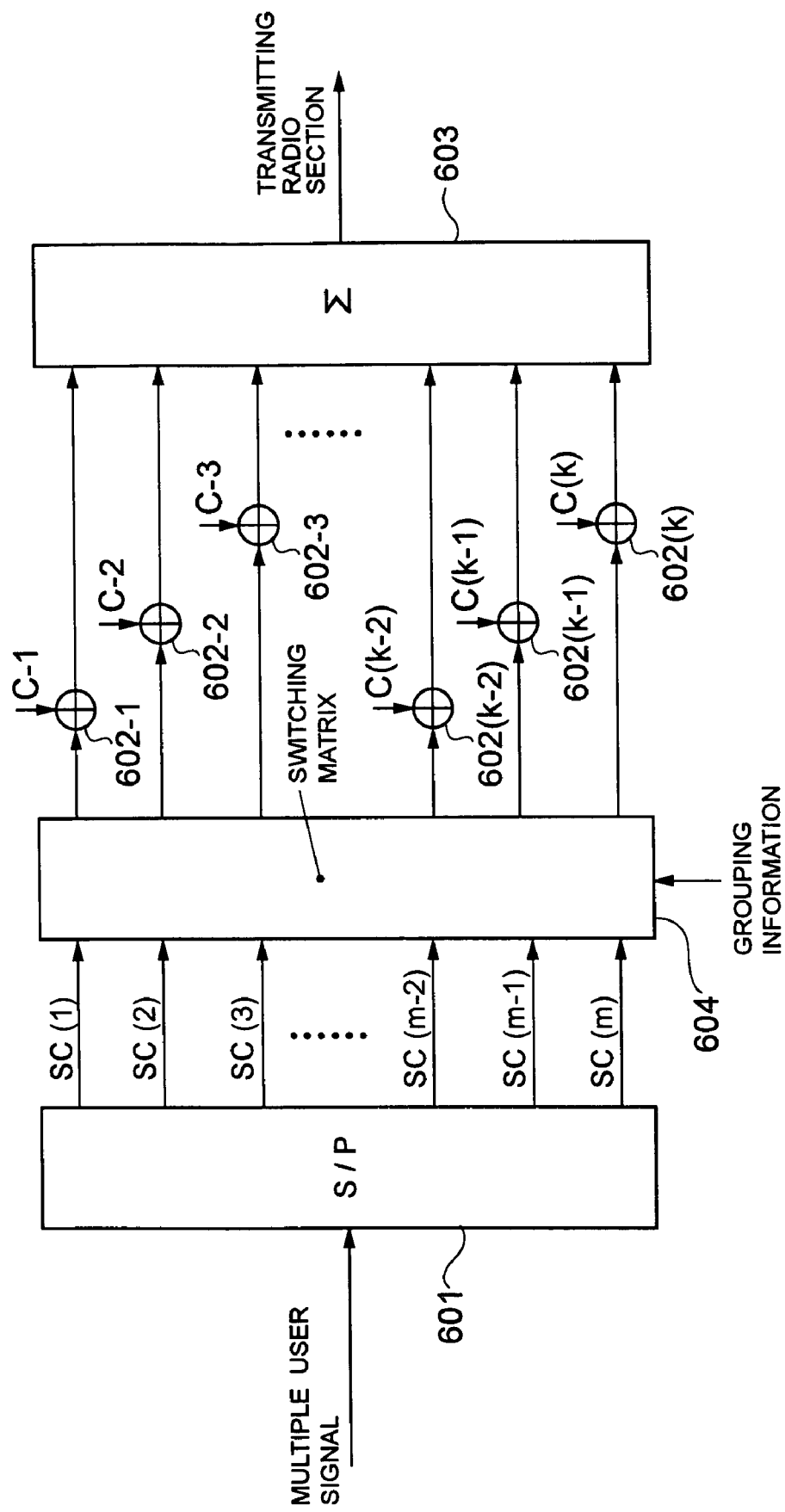
FIG. 6 is an illustration showing a calibration coefficient adding method 2.

As shown in FIG. 6, a switching matrix (604) is added between the S/P and each adder shown in FIG. 5.

The switching matrix receives the grouping information obtained through long-cycle calibration and applies one-to-K connection to subcarrier output SC (1), SC (2), . . . , and SC (m). That is, input M subcarriers are grouped into K groups or less and output to an adder (602-1) to adder k (602-k). In this case, K is equal to the number of areas divided by the demodulation symbol area determining section (112 in FIG. 1).

The switching matrix (604) combines subcarriers in the same group to be corrected by using a common calibration coefficient and the number of adders to be added with the calibration coefficient can be decreased up to the number of I/Q coordinate planes divided by the demodulation symbol area determining section (112 in FIG. 1).

For example, in the case of a transceiver for performing transmission through 8 antenna elements by using 1,000 subcarriers, it is strictly necessary to calculate a calibration coefficient for each of 1,000×8=8,000 subcarriers. However, when there are only 40 areas in which a demodulation symbol point group is present in long-cycle calibration, it is enough to generate 40 kinds of calibration signals in the transmission baseband processing means 2 (105-2) to transmission baseband processing section N (105-N). Moreover, the number of subcarriers for transmitting calibration signals from the transmission baseband processing section 1 (105-1) serving as a reference transmission route is only 40 at most. However, when the same subcarrier number is selected in different transmission routes, the number of subcarriers to be transmitted from the transmission baseband processing section 1 (105-1) becomes less than 40 kinds. Similarly, the number of calibration coefficients calculated through short-cycle calibration also becomes 40 and all of 8,000 carriers can be calibrated by 40 calibration coefficients.

Therefore, in the case of an array antenna transceiver for performing broadband transmission by using a plurality of subcarriers, by grouping subcarriers having frequency characteristics hardly different each other independently of a transmission route number of subcarrier number, it is possible to provide a calibrating method keeping a certain accuracy while reducing a signal throughput by a simple configuration. This calibrating method can be applied not only to a transmitter using a multicarrier but also a transmitter using a single carrier as long as an array antenna transceiver is used.

Another Embodiment of the Invention

FIG. 2 shows another embodiment relating to the first embodiment of the present invention.

In the case of the first mode of this embodiment, a transmission route and subcarrier included in the same group are decided on a previously divided I/Q coordinate plates. However, the same advantag can be obtained by deciding the same group areas in accordance with the dispersion of a group of demodulation symbol points and grouping them. In this case, the demodulation symbol group selecting section (215) serves as means for outputting a demodulation symbol point (phase/amplitude information), transmission route number, and subcarrier number to the calibration subcarrier selecting section (213) about a demodulation symbol point group assigned to the same group.

The temperature monitoring section (216) serves as means for monitoring the temperature in a transceiver and outputting temperature information to the calibration control section (214). The calibration control section (214) serves as means for outputting control signals for calibrating all subcarriers in all transmission routes for grouping pieces of temperature information to which long-cycle calibration is applied into the transmission baseband processing section 1 (205-1) to transmission baseband processing section N (205-N), the calibration signal demodulating section 1 (209-1) to calibration signal demodulating section L (209-L), and the demodulation result processing section (210) when the temperature information exceeds a preset temperature fluctuation.

Thus, in an environment in which the temperature fluctuation of a transceiver is large, it is possible to prevent a calibration accuracy from deteriorating by raising the calibration frequency for grouping.

Another Embodiment of the Invention

Figure 7:
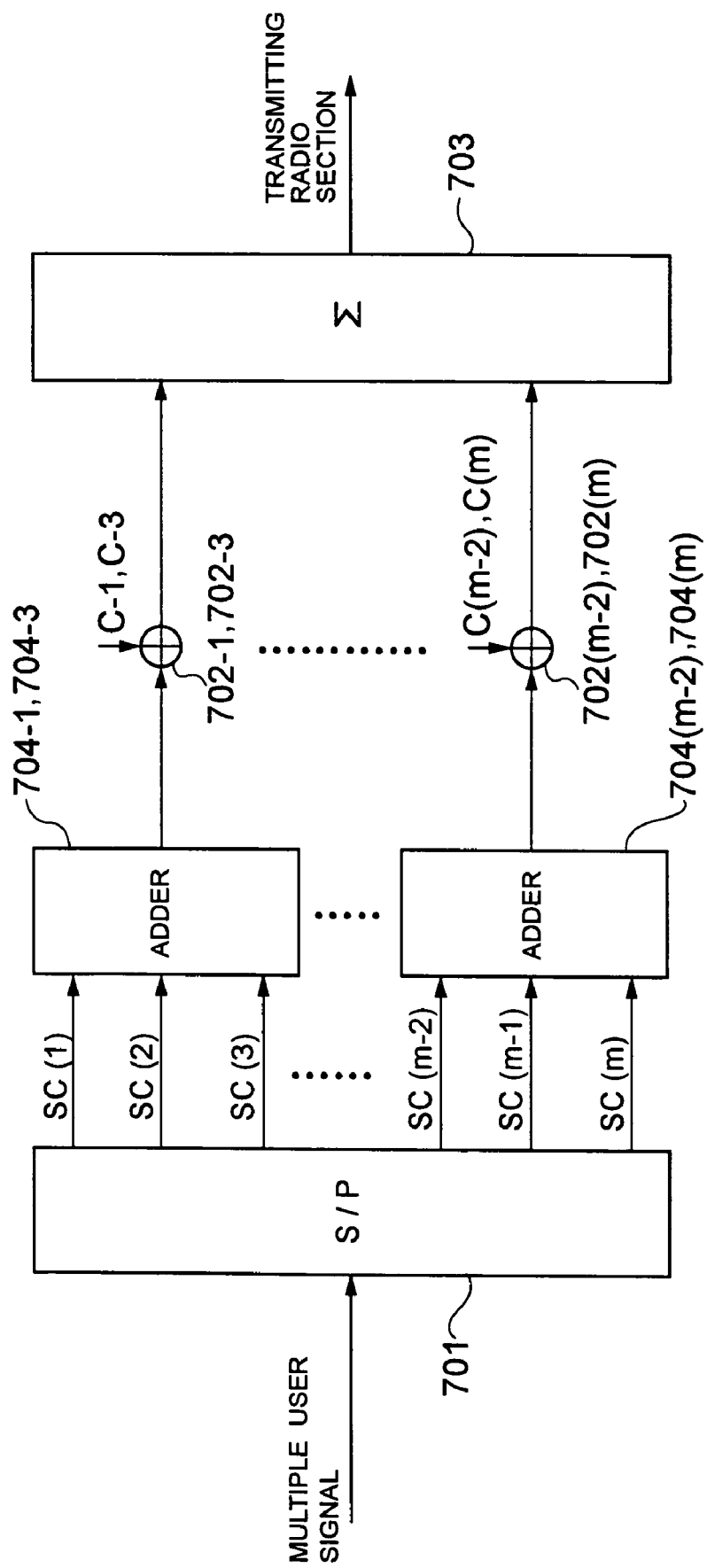
FIG. 7 is an illustration showing a calibration coefficient adding method 3.
Figure 8:
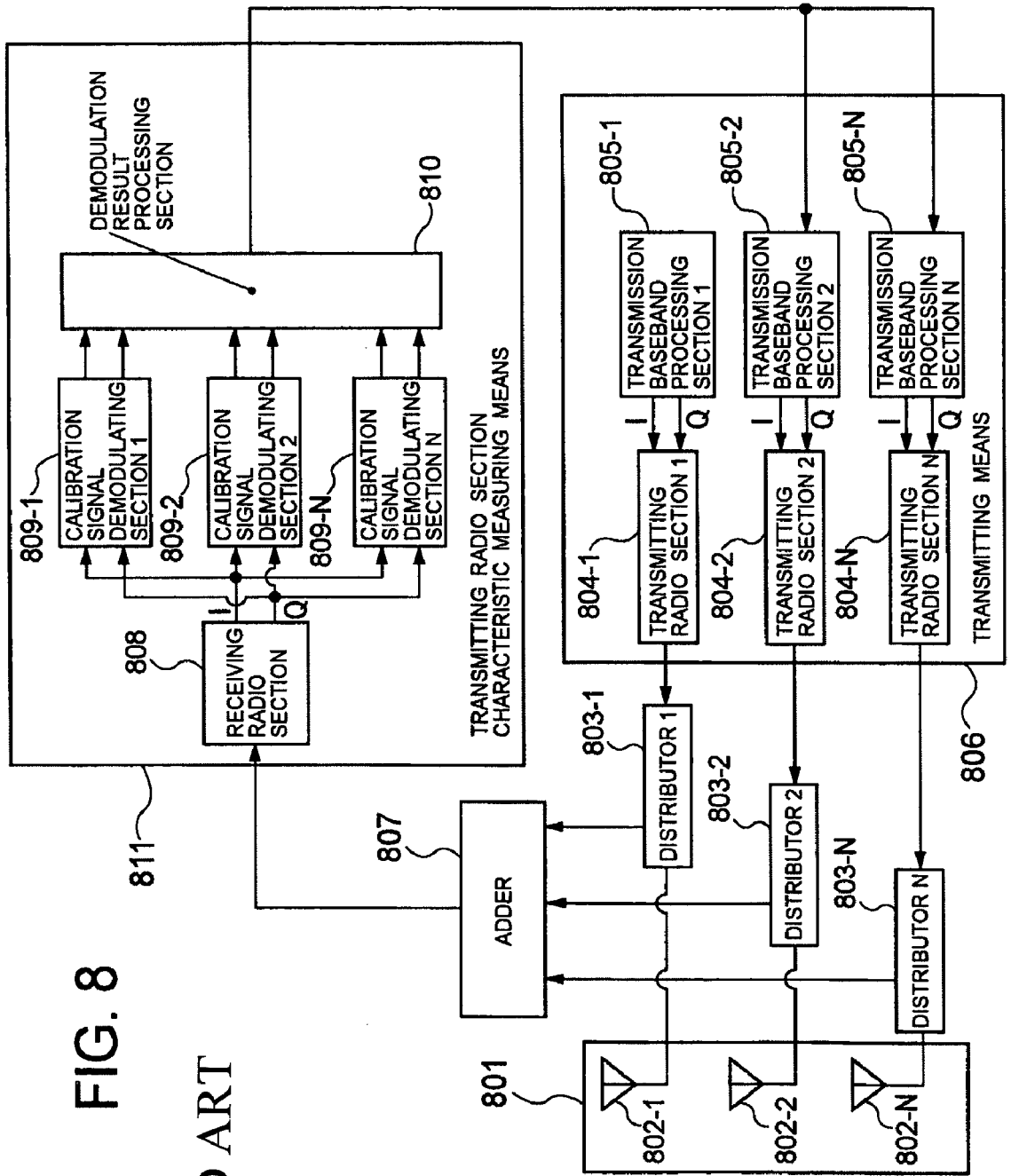
FIG. 8 is an illustration showing an array antenna transceiver using a conventional calibrating method.
Figure 9:
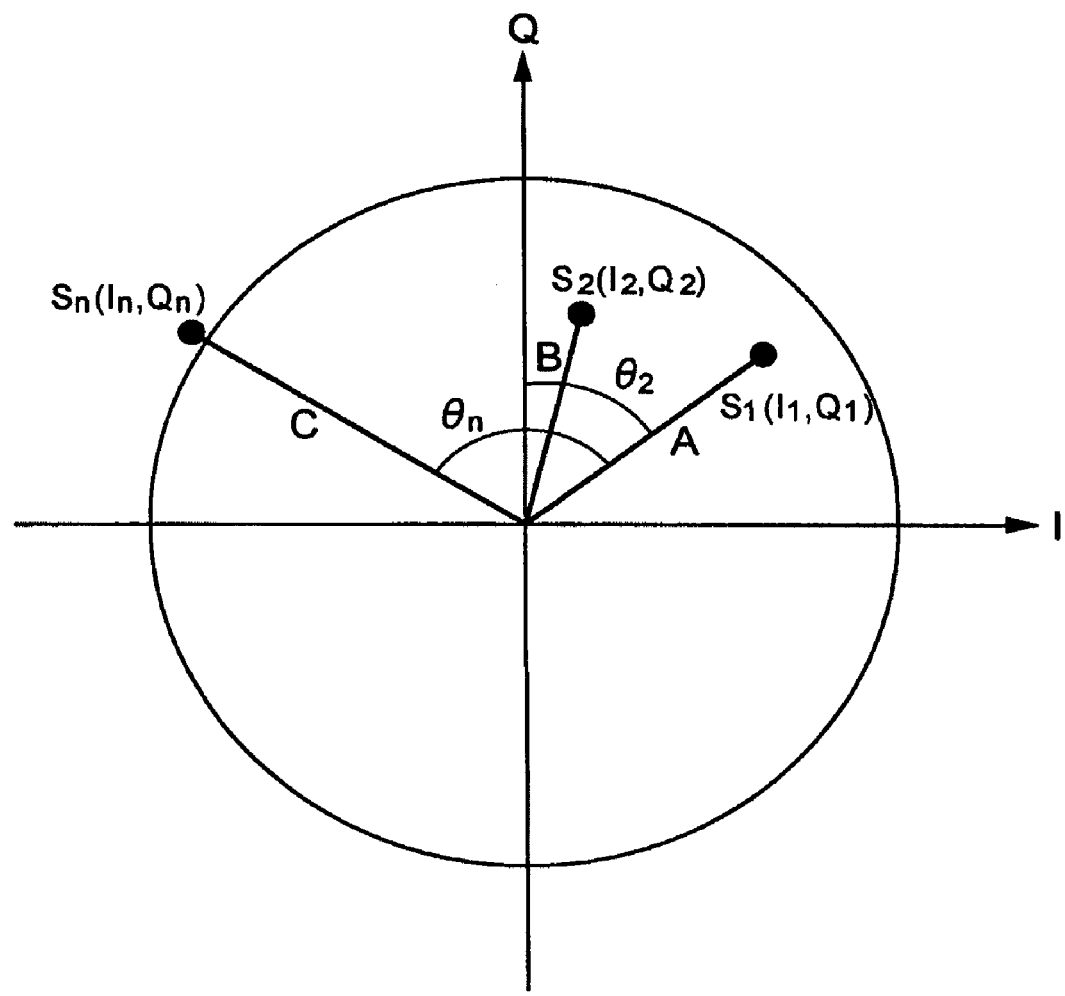
FIG. 9 is an illustration showing a phase difference and an amplitude ratio (before normalization)
Figure 10:
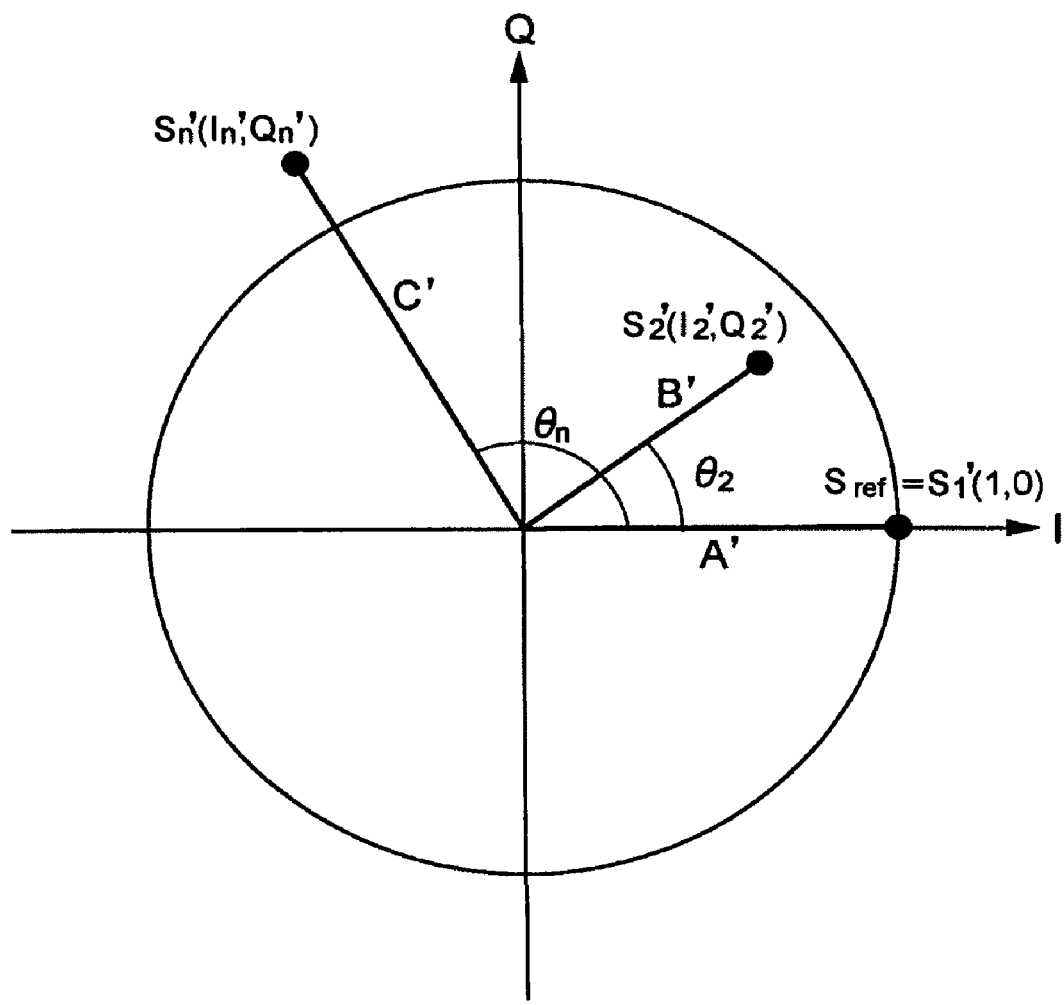
FIG. 10 is an illustration showing a phase difference and an amplitude ratio (after normalization).

In the case of the first mode of this embodiment, a calibration coefficient is set to all subcarriers in the transmission baseband processing means 2 (105-2) to transmission baseband processing section N (105-N). However, components in a transmission route show similar frequency characteristics (phase/amplitude) about neighbor subcarriers, j adjacent subcarriers are previously grouped, a common calibration coefficient is set to the subcarriers, and a demodulation symbol point obtained by transmitting a calibration signal from one of the j subcarriers is assumed as a common demodulation symbol point in the j subcarriers. By grouping the neighbor subcarriers or subcarriers having very similar frequency characteristics (phase/amplitude) though they are not close to each other, it is possible to further decrease the number of subcarriers to be calibrated. FIG. 7 shows a calibration coefficient adding method in this calibrating method. Though the number of adjacent subcarriers j to be previously grouped is decided by depending on a transmission band or the number of subcarriers, j is equal to 3 in FIG. 7.

As described above, the present invention has the following advantages.

Firstly, by grouping subcarriers having frequency characteristics (phase/amplitude) which are almost the same in not only the same transmission route but also different transmission routes, it is possible to decrease the size of a transceiver including a calibration signal generating section, calibration signal demodulating section, and calibration coefficient calculating section. Therefore, it is possible to provide a transmission route calibrating method capable of keeping a certain accuracy while minimizing the increase of the size of a transceiver for calibration in an array antenna transceiver for performing broadband transmission by a multicarrier.

Secondly, by grouping subcarriers having frequency characteristics (phase/amplitude) which are almost the same in not only the same transmission route but also different transmission routes and performing calibration with a greatly reduced number of subcarriers, it is possible to set calibration coefficients of all subcarriers in all transmission routes. Therefore, it is possible to provide a transmission route calibrating method for keeping a certain accuracy while minimizing the increase of a signal throughput for calibration in an array antenna transceiver for performing broadband transmission by a multicarrier.

Thirdly, when a temperature fluctuation by which frequency characteristics (phase/amplitude) are changed occurs by warning a temperature of the transceiver, it is possible to provide a transmission route calibrating method capable of keeping a certain accuracy even for a temperature fluctuation of a transceiver though the number of carriers for calibration and the number of carriers for calculation of calibration coefficients are greatly decreased because the frequency of calibration for grouping is raised.

What is claimed is:

1. An array antenna transceiver for performing broadband transmission by a multicarrier, comprising:
   means for grouping all subcarriers into a plurality of subcarrier groups; and
   means for calibrating a transmission route for each group, wherein said means for calibrating a transmission route includes:
   a plurality of calibration signal demodulating means for demodulating a transmission route number and subcarrier number for calibration of a transmission route and outputting the demodulation results,
   demodulation result processing means for outputting a transmission route number, subcarrier number, and normalized demodulation symbol point (phase/amplitude information) by receiving demodulation results of calibration signals output from the calibration signal demodulating means and outputting calculated calibration coefficients by receiving demodulation results of calibration signals output from said calibration signal demodulating means,
   demodulation symbol area determining means for determining an area to which each demodulation result belongs on a previously divided I/Q coordinate plane by receiving a transmission route number, subcarrier number, and normalized demodulation symbol point (phase/amplitude information) output from said demodulation result processing means and outputting the determination result,
   calibration subcarrier selecting means for selecting one transmission route number and subcarrier number closest to the medium value in a area out of demodulation symbol point (phase/amplitude information) group classified every area output from said demodulation symbol area determining means and outputting the determination results,
   calibration control means for outputting a transmission route number and subcarrier number selected every area output from said calibration subcarrier selecting means and outputting a calibration mode change signal for changing calibration modes, and
   transmission baseband processing means for setting calibration coefficients of all subcarriers in all transmission routes by receiving calibration coefficients output from said demodulation result processing means and a transmission route number and subcarrier number classified into the same area output from calibration coefficients and generating a calibration signal in accordance with a calibration mode change signal supplied from said calibration control means, a transmission route to be calibrated, and subcarrier information.

2. The array antenna transceiver according to claim 1, wherein subcarriers having phase/amplitude characteristics hardly different each other are grouped in accordance with demodulation results of all subcarriers in all transmission routes independently of the same transmission route or different transmission routes.

3. The array antenna transceiver according to claim 2, wherein a calibration coefficient is calculated only for one subcarrier in the same group and the obtained calibration coefficient is set as a calibration coefficient common to all subcarrier groups belonging to the same group.

4. The array antenna transceiver according to claim 2, wherein a subcarrier having a demodulation symbol point closest to the center in an area in a subcarrier group belonging to the same group is selected as "a subcarrier for calibration".

5. The array antenna transceiver according to claim 2, wherein calibration of all subcarriers in all transmission routes to be grouped is performed in a long cycle and calibration of the subcarriers in the grouped transmission routes is performed in a short cycle.

6. The array antenna transceiver according to claim 2, wherein a calibration accuracy can be adjusted by changing the number of divided areas to be grouped.

7. The array antenna transceiver according to claim 1, wherein said means for calibrating a transmission route includes;
   a plurality of calibration signal demodulating means for demodulating a transmission route number and subcarrier number for calibration of a transmission route and outputting the demodulation results,
   demodulation result processing means for outputting a transmission route number, subcarrier number, and normalized demodulation symbol point (phase/amplitude information) by receiving demodulation results of calibration signals from the calibration signal demodulating means and outputting calculated calibration coefficients by receiving demodulation results of calibration signals output from said calibration signal demodulating means,
   demodulation symbol group selecting means for outputting a demodulation symbol point, transmission route number, and subcarrier number of the same group by receiving a transmission route number, subcarrier number, and normalized demodulation symbol point (phase/amplitude information) output from said demodulation result processing means and thereby deciding the same symbol point group in accordance with dispersion of demodulation symbol points of demodulation results,
   calibration subcarrier selecting means for selecting one transmission route number and subcarrier number closest to the medium value in a group out of a demodulation symbol point (phase/amplitude information) group classified every group output from said demodulation symbol group selecting means and outputting the determination results,
   calibration control means for outputting a transmission route number and subcarrier number selected every group output from the calibration subcarrier selecting means and outputting a calibration mode change signal for changing calibration modes, and
   transmission baseband processing means for generating a calibration signal by receiving a calibration coefficient output from said demodulation result processing means and a transmission route number and subcarrier number classified into the same group output from said demodulation symbol group selecting means and thereby setting calibration coefficients of all subcarriers in all transmission routes and moreover in accordance with a calibration mode change signal supplied from said calibration control means, a transmission route to be calibrated, and subcarrier information.

8. The array antenna transceiver according to claim 7, wherein calibration for grouping all subcarriers in all transmission routes is performed in accordance with temperature information of the transceiver.

9. The array antenna transceiver according to claim 1, wherein subcarriers in the same group are combined and then a calibration coefficient is added to reduce the number of adding circuits.

10. An array antenna transceiver according to claim 1, wherein neighbor subcarrier groups in which components in a transmission route have a similar frequency characteristic (phase/amplitude) are grouped in a frequency direction to apply a common calibration coefficient.

11. The array antenna transceiver according to claim 1, wherein the means for grouping all subcarriers into a plurality of subcarrier groups further comprises:
means for detecting demodulation symbol points of all subcarriers in all transmission routes and classifying the demodulation symbol points in accordance to preset groups.

12. A method of calibrating a transmission route using an array antenna transceiver for performing wide-band transmission by a multicarrier, comprising:
a step of grouping all subcarriers into a plurality of subcarrier groups and calibrating a transmission route for each group,
wherein said step of calibrating a transmission route includes:
a calibration signal demodulating step of demodulating a transmission route number and subcarrier number for calibration of a transmission route and outputting the demodulation result;
demodulation result processing step of outputting a transmission route number, subcarrier number, and normalized demodulation symbol point (phase/amplitude information) by receiving a demodulation result of a calibration signal output from said calibration signal demodulation step and outputting a calculated calibration coefficient by receiving a demodulation result of a calibration signal output from said calibration signal demodulating step,
a demodulation symbol area determining step of determining an area to which each demodulation result belongs on a previously divided I/Q coordinate plane and outputting the determination result by receiving a transmission route number, subcarrier number, and normalized demodulation symbol point (phase/amplitude information) from the demodulation result processing step,
a calibration subcarrier selecting step of selecting one transmission route number and subcarrier number closest to the medium value in an area output from the demodulation symbol area determining step out of demodulation symbol point (phase/amplitude information) groups classified every area output from said demodulation symbol area determining step and outputting the selection results,
a calibration control step of outputting a transmission route number and subcarrier number selected every area output from said calibration subcarrier selecting step and changing calibration modes, and
a transmission baseband processing step of setting calibration coefficients of all subcarriers in all transmission routes and moreover generating a calibration signal in accordance with a calibration mode change signal supplied from said calibration control step, a transmission route to be calibrated, and subcarrier information by receiving a calibration coefficient output from the demodulation result processing step and a transmission route number and subcarrier number classified into the same area output from said demodulation symbol area determining means.

13. The transmission route calibrating method according to claim 12, wherein subcarriers having phase/amplitude characteristics hardly different each other are grouped in accordance with demodulation results of all subcarriers in all transmission routes independently of the same transmission route or different transmission routes.

14. The transmission route calibrating method according to claim 13, wherein a calibration coefficient is calculated only for one subcarrier in the same group and the obtained calibration coefficient is set as a calibration coefficient common to all subcarrier groups belonging to the same group.

15. The transmission route calibrating method according to claim 13, wherein a subcarrier having a closest demodulation symbol point closest to the center in an area in a subcarrier group belonging to the same group is selected as "a subcarrier for calibration".

16. The transmission route calibrating method according to claim 13, wherein calibration of all subcarriers in all transmission routes to be grouped is performed in a long cycle and calibration of the subcarriers in the grouped transmission routes is performed in a short cycle.

17. The transmission route calibrating method according to claim 13, wherein a calibration accuracy can be adjusted by changing the number of divided areas to be grouped.

18. The transmission route calibrating method according to claim 12, wherein the step of calibrating a transmission route includes;
a calibration signal demodulating step of demodulating a transmission route number and subcarrier number for calibration of a transmission route and outputting the demodulation results,
a demodulation result processing step of outputting a transmission route number, subcarrier number, and normalized demodulation symbol point (phase/amplitude information) by receiving a demodulation result of a calibration signal output from said calibration signal demodulation step and moreover outputting a calculated calibration coefficient by receiving a demodulation result of a calibration signal output from each of the calibration signal demodulating means,
a demodulation symbol group selecting step of deciding the same symbol point group in accordance with the dispersion of demodulation symbol points of demodulation results by receiving a transmission route number, subcarrier number, and normalized demodulation symbol point (phase/amplitude information) output from said demodulation result processing step and outputting a demodulation symbol point, transmission route number, and subcarrier number of the same group,
a calibration subcarrier selecting step of selecting one transmission route number and subcarrier number closest to the medium value in a group out of a demodulation symbol point (phase/amplitude information) groups classified every group output from the demodulation symbol group selecting step and outputting the determination results,
a calibration control step of outputting a transmission route number and subcarrier number selected every group output from the calibration subcarrier selecting step and moreover outputting a calibration mode change signal for changing calibration modes, and
a transmission baseband processing step of setting calibration coefficients of all subcarriers in all transmission routes by receiving a calibration coefficient output from said demodulation result processing step and a transmission route number and subcarrier number classified into the same group output from said demodulation symbol group selecting step and generating a calibration signal in accordance with a calibration mode change signal supplied from said calibration control step, a transmission route to be calibrated, and subcarrier information.

19. The transmission route calibrating method according to claim 18, wherein calibration for grouping all subcarriers in all transmission routes is executed in accordance with the temperature information of the transceiver.

20. The transmission route calibrating method according to claim 12, wherein a calibration coefficient is added after synthesizing subcarriers in the same group to reduce the number of adding circuits.

21. The method of calibrating a transmission route used by an array antenna transceiver for performing broadband transmission by a multicarrier according to claim 12, wherein neighbor subcarrier groups in which components in a transmission route have a similar frequency characteristic (phase/amplitude) are grouped in a frequency direction to apply a common calibration coefficient.

* * * * *